(12) United States Patent
Singh et al.

(10) Patent No.: US 12,041,455 B2
(45) Date of Patent: Jul. 16, 2024

(54) SECURITY ENHANCEMENTS FOR CELLULAR COMMUNICATION SYSTEMS

(71) Applicant: Nokia Technologies Oy, Espoo (FI)

(72) Inventors: Shubhranshu Singh, Munich (DE); Chaitanya Aggarwal, Munich (DE); Saurabh Khare, Bangalore (IN); Konstantinos Samdanis, Munich (DE); Gerald Kunzmann, Munich (DE)

(73) Assignee: Nokia Technologies Oy, Espoo (FI)

( * ) Notice: Subject to any disclaimer, the term of this patent is extended or adjusted under 35 U.S.C. 154(b) by 406 days.

(21) Appl. No.: 17/514,120

(22) Filed: Oct. 29, 2021

(65) Prior Publication Data

US 2023/0136287 A1    May 4, 2023

(51) Int. Cl.
*H04W 12/12* (2021.01)
*H04W 12/122* (2021.01)
*H04W 12/128* (2021.01)

(52) U.S. Cl.
CPC ....... *H04W 12/122* (2021.01); *H04W 12/128* (2021.01)

(58) Field of Classification Search
CPC .................................................... H04W 12/12
See application file for complete search history.

(56) References Cited

U.S. PATENT DOCUMENTS

2022/0159467 A1*   5/2022   Koral ................. H04L 63/0876
2022/0166790 A1*   5/2022   Koral ..................... H04L 43/16

* cited by examiner

*Primary Examiner* — Michael T Vu
(74) *Attorney, Agent, or Firm* — Laine IP Oy

(57) ABSTRACT

According to an example aspect of the present invention, there is provided a method comprising, determining, by an apparatus configured to operate as a network function a cellular communication system, at least two disjoint network paths, wherein the at least two disjoint network paths are different paths, and comprise different physical resources, transmitting, by the apparatus, a subscription request to an analytics function of the cellular communication system, to request notifications about attacks or risks of attacks on at least one network function on at least one of the at least two disjoint network paths, receiving from the analytics function, by the apparatus, information about at least one compromised network entity and/or at least one network entity having a risk of being compromised on said at least one of the at least two disjoint network paths and performing, by the apparatus, attack mitigation based on said information.

19 Claims, 7 Drawing Sheets

SECURITY ENHANCEMENTS FOR CELLULAR COMMUNICATION SYSTEMS

FIELD

Various example embodiments relate in general to cellular communication systems and more specifically, to security in such systems.

BACKGROUND

Security is important at least in cellular communication systems, such as in 5G core networks developed by the 3rd Generation Partnership Project, 3GPP. In 5G core networks, even trusted Network Functions, NFs, may be compromised and thus act as malicious network nodes. The 3GPP still develops 5G core networks and there is a need to provide improved methods, apparatuses and computer programs for enhancing security of 5G core networks. Such enhancements may be exploited in other cellular communication networks as well.

SUMMARY

According to a first aspect of the present invention, there is provided an apparatus comprising at least one processing core, at least one memory including computer program code, the at least one memory and the computer program code being configured to, with the at least one processing core, cause the apparatus at least to perform, determine at least two disjoint network paths, wherein the at least two disjoint network paths are different paths, and comprise different physical resources, transmit a subscription request to an analytics function of the cellular communication system, to request notifications about attacks or risks of attacks on at least one network function on at least one of the at least two disjoint network paths, receive, from the analytics function, information about at least one compromised network entity and/or at least one network entity having a risk of being compromised that affects adversely said at least one of the at least two disjoint network paths and perform attack mitigation based on said information. The apparatus of the first aspect may be configured to operate as a network function of a cellular communication system.

Embodiments of the first aspect may comprise at least one feature from the following bulleted list or any combination of the following features:
- wherein said different physical resources comprise different network functions, routers, switches, and/or hardware used by software;
- wherein the at least two disjoint network paths are determined based on information received from a network management plane;
- wherein said information received from the network management plane comprises identities of network functions on the at least two disjoint network paths and/or at least one flag indicating that the at least two network paths are disjoint;
- wherein the at least two disjoint network paths are determined based on at least one indication associated with a session establishment procedure of a user equipment;
- wherein the at least one memory and the computer program code are further configured to, with the at least one processing core, cause the apparatus at least to perform, based on said information, attack mitigation related to said at least one of the at least two disjoint network paths by performing path switching, new path establishment and/or selection of a different user plane function;
- wherein the at least one memory and the computer program code are further configured to, with the at least one processing core, cause the apparatus at least to perform, based on said information, attack mitigation related to another network path by performing a reconfiguration of said another network path;
- wherein the at least one memory and the computer program code are further configured to, with the at least one processing core, cause the apparatus at least to transmit a session modification request to a user plane function, to request to remove from a user path the at least one compromised network entity and/or at least one network entity having a risk of being compromised and/or dropping of at least one packet of the compromised network entity and/or at least one network entity having a risk of being compromised.

According to a second aspect of the present invention, there is provided an apparatus comprising at least one processing core, at least one memory including computer program code, the at least one memory and the computer program code being configured to, with the at least one processing core, cause the apparatus at least to perform, receive a subscription request from a network function of the cellular communication system, requesting notifications about attacks or risks of attacks on at least one network function on at least one network path, determine that at least one compromised network entity or network entity having a risk of being compromised is on at least one of at least two disjoint network paths and transmit information about the compromised network entity and/or at least one network entity having a risk of being compromised to the network function. The apparatus of the second aspect may be configured to operate as an analytics function of a cellular communication system.

Embodiments of the second aspect may comprise at least one feature from the following bulleted list or any combination of the following features:
- wherein the at least one memory and the computer program code are further configured to, with the at least one processing core, cause the apparatus at least to transmit a subscription request to at least one other network function and/or application function, to request information for determining whether there is at least one compromised network entity and/or at least one network entity having a risk of being compromised and determine the compromised network entity and/or at least one network entity having a risk of being compromised based on said information received from the at least one other network function and/or application function;
- wherein the at least one memory and the computer program code are further configured to, with the at least one processing core, cause the apparatus at least to receive a signaling storm subscription request from the network function and/or at least one other network function, requesting notifications of signaling storm attacks, detect at least one signaling storm attack and transmit a notification of each detected signaling storm attack to the network function and/or said at least one other network function that has requested notifications of signaling storm attacks.

According to a third aspect, there is provided a first method comprising, determining at least two disjoint network paths, wherein the at least two disjoint network paths are different paths, and comprise different physical resources, transmitting a subscription request to an analytics function of the cellular communication system, to request notifications about attacks or risks of attacks on at least one network function on at least one of the at least two disjoint network paths, receiving from the analytics function information about at least one compromised network entity and/or at least one network entity having a risk of being compromised on said at least one of the at least two disjoint network paths and performing attack mitigation based on said information. The method of the third aspect may be performed by an apparatus configured to operate as a network function of a cellular communication system.

According to a fourth aspect, there is provided a second method comprising, receiving a subscription request from a network function of the cellular communication system, requesting notifications about attacks or risks of attacks on at least one network function on at least one network path, determining that at least one compromised network entity or network entity having a risk of being compromised is on at least one of at least two disjoint network paths and transmitting information about the compromised network entity and/or at least one network entity having a risk of being compromised to the network function. The method of the fourth aspect may be performed by an apparatus configured to operate as an analytics function of a cellular communication system.

According to a fifth aspect of the present invention, there is provided an apparatus comprising means for determining at least two disjoint network paths, wherein the at least two disjoint network paths are different paths, and comprise different physical resources, means for transmitting a subscription request to an analytics function of the cellular communication system, to request notifications about attacks or risks of attacks on at least one network function on at least one of the at least two disjoint network paths, means for receiving from the analytics function information about at least one compromised network entity and/or at least one network entity having a risk of being compromised on said at least one of the at least two disjoint network paths and means for performing attack mitigation based on said information. The apparatus of the fifth aspect may comprise means for operating as a network function of a cellular communication system.

According to a sixth aspect of the present invention, there is provided an apparatus comprising means for receiving a subscription request from a network function of the cellular communication system, requesting notifications about attacks or risks of attacks on at least one network function on at least one network path, means for determining that at least one compromised network entity or network entity having a risk of being compromised is on at least one of at least two disjoint network paths and means for transmitting information about the compromised network entity and/or at least one network entity having a risk of being compromised to the network function. The apparatus of the sixth aspect may comprise means for operating as an analytics function of a cellular communication system. The apparatus of the sixth aspect may comprise means for performing the second method.

According to some aspects of the present invention, there is provided non-transitory computer readable medium having stored thereon a set of computer readable instructions that, when executed by at least one processor, cause an apparatus to at least perform the first method or the second method.

According to some aspects of the present invention, there is provided a computer program comprising instructions which, when the program is executed by an apparatus, cause the apparatus to carry out the first method or the second method.

EMBODIMENTS

Embodiments of the present invention provide security enhancements for cellular communication systems. More specifically, embodiments of the present invention make it possible to detect trusted but compromised Network Functions, NFs, and perform attack mitigation based on information about the compromised NFs, wherein said information may be prepared by an analytics function in a core network of a cellular communication system.

An NF, such as a Session Management Function, SMF, may determine at least two disjoint Transport Network, TN, paths that use different physical resources, such as different routers and/or switches. For instance, the at least two disjoint TN paths may comprise a first and a second TN path, wherein each physical resource of the first disjoint TN path is different compared to physical resources of the second disjoint TN path. That is, no physical resource of the first disjoint TN path is among a set of physical resources of the second disjoint TN path.

The NF may further subscribe to the analytics function to receive notifications about attacks or risks of attacks on at least one NF on at least one of the at least two disjoint TN paths. The analytics function may then predict, or detect, that at least one compromised NF and/or at least one NF having a risk of being compromised affects adversely the performance of at least one of the at least two disjoint TN paths and inform the NF about the at least one compromised NF and/or the at least one NF having a risk of being compromised. The NF may therefore perform attack mitigation based on said information at least one compromised NF and/or the at least one NF having a risk of being compromised.

The NF may be an NF of a cellular communication system, i.e., the NF may be in a core network of the cellular communication system or in a Radio Access Network, RAN, of the cellular communication system. Even though the at least two disjoint TN paths are used as an example, embodiments of the present invention may be also applied for the core network similarly.

Figure 1:
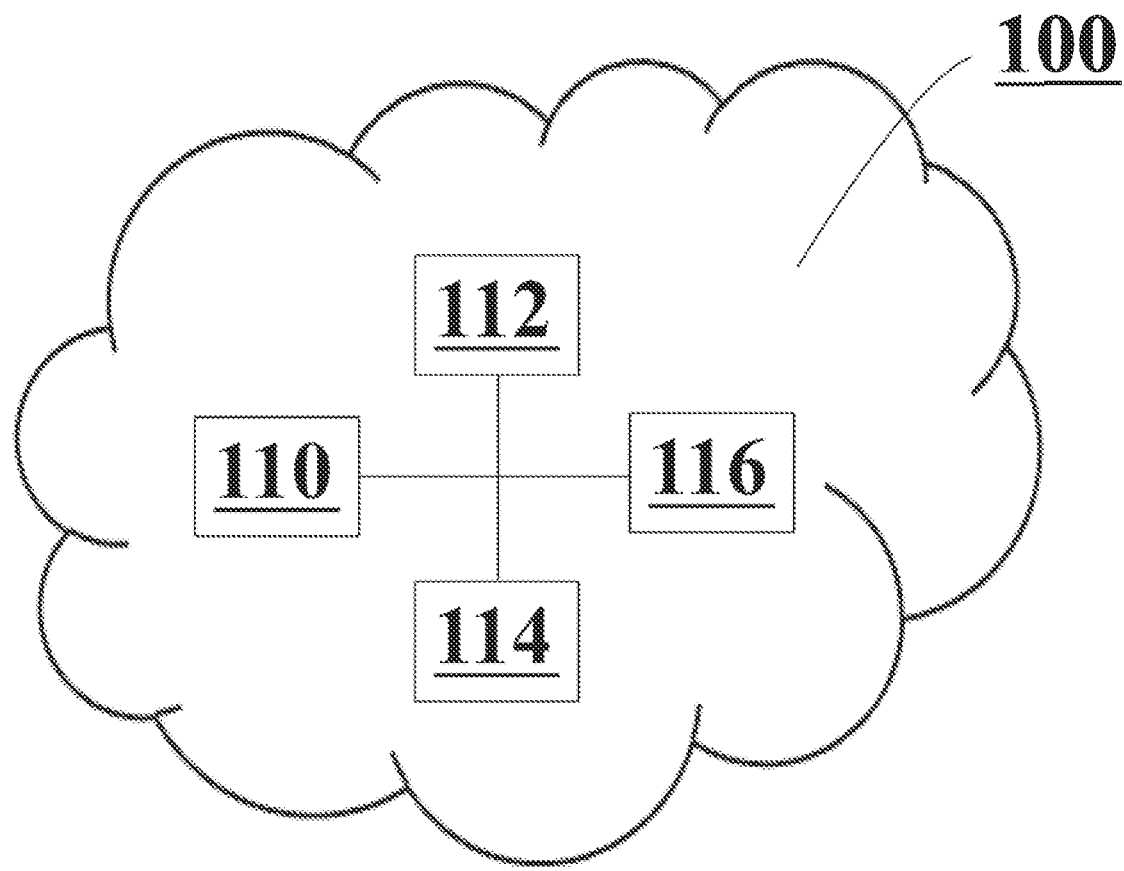
FIG. 1 illustrates a network scenario in accordance with at least some embodiments.

FIG. 1 illustrates an example of a communication system in accordance with at least some embodiments. More specifically, FIG. 1 illustrates core network 100 of a cellular communication system. Core network 100 may comprise at least TN controller 110, Operations, Administration and Maintenance, OAM, 112, SMF 114 and analytics function 116, such as a Network Data Analytics Function, NWDAF, or Management Data Analytics Function, MDAF. In general, any NF may perform said tasks, even though SMF 114 is used as an example in various embodiments described herein.

TN controller 110, OAM 112, SMF 114 and analytics function 116 may be NFs. An NF may refer to an operational and/or a physical entity. An NF may be a specific network node or element, or a specific function or set of functions carried out by one or more entities, such as Virtual Network Functions, VNFs. One physical apparatus may be configured to perform, or comprise means for performing, tasks of one or multiple NFs. TN controller 110, OAM 112, SMF 114 and analytics function 116 may be connected to each other via at least one wired connection and/or wireless connection, and communicate with each other via said connection(s). In general, NFs may be running on top of a TN and the TN may comprise physical and/or virtual routers and switches.

TN controller 110, OAM 112, SMF 114 and analytics function 116 may be configured to operate according to at least one cellular communication standard, such as at least one standard defined by the 3rd Generation Partnership Project, 3GPP, like a 5G or a 6G standard in the future. In some example embodiments, TN controller 110, OAM 112, SMF 114 and analytics function 116 may be configured to operate according to 3GPP TS 23.501, TS 23.502 and/or TS 23.503. TS 23.501, TS 23.502 and corresponding Stage 3 Rel-16 specifications allow the creation of multiple user plane paths. For instance, Clause 5.33 of TS 23.502 defines dual connectivity based on end-to-end redundant user plane paths. The objective is to ensure redundancy of user packets, to support Ultra-Reliable Low-Latency Communication, URLLC, services. TS 23.501, TS 23.502 and TS 23.503 provide different procedures, policies and rules that an SMF may provide over N4 to User Plane Function, UPF, i.e., for instructing UPFs to handle at least downlink user plane packets as required.

Embodiments of the present invention may be exploited at least in scenarios, wherein localized attacks and/or NF-specific attacks are performed, for example if a certain, trusted NF is compromised or starts to behave abnormally due to malware injection, etc. Such use cases may require rapid reaction without compromising the performance of ongoing services. In particular, embodiments of the present invention may be exploited to address the following challenges:

- how to detect localized or individual NF-specific attacks in core network 100 of a cellular communication system, such as in 5G core networks;
- how to mitigate NF-specific attacks, especially if the NF, such as a UPF is on an existing data path of an active Packet Data Unit, PDU, session;
- how to prevent similar attacks on other NFs of core network 100, e.g., how to prevent attacks on other UPFs on the same data path and/or any other UPFs in the 5G core network especially if these UPFs are managed by the same SMF;
- how to detect and mitigate an organized or planned attack by a group of User Equipments, UEs, scattered over a geographical area, e.g., served by different Access and Mobility management Functions, AMFs, and other NF instances of core network 100, causing signaling storms in core network 110. Unlike the challenges identified above, such signaling storm attacks may be related to both localized and/or even network wider attacks.

According to some example embodiments of the present invention, at least the challenges mentioned above can be resolved using the following solution. At the first phase, an NF, such as SMF 114 of FIG. 1, may determine at least two different disjoint TN paths, wherein the at least two different disjoint TN paths are between the NF and at least one other NF, and comprise different physical resources. More specifically, at least two different disjoint TN paths may be determined for communication between the NF and at least one other NF. The at least two disjoint TN paths may be paths which do not share any common physical resources, like routers and/or switches. That is, the at least two disjoint TN paths do not coincide at any point.

The at least two different disjoint TN paths may be determined by the NF based on an indication about the at least two different disjoint TN paths, or resources of the at least two different disjoint TN paths. The at least two different disjoint TN paths may be for sensitive data and/or premium customers. The NF may also transmit a subscription request to analytics function 116 of FIG. 1, to get notifications about risk of attacks on the at least two disjoint TN paths, i.e., about attacks which affect adversely the performance of at least one of the at least two disjoint paths.

At the second phase, analytics function 116 may determine that at least one compromised NF is affects adversely said at least one of the at least two different disjoint TN paths. Analytics function 116 may also transmit information about the at least one compromised NF to the NF. The at least one compromised NF may be an NF in the same network or an external node. Analytics-based approach may be thus used to predict and proactively detect compromised NF(s) and security incidents due to external malicious data sources.

At the third phase, the NF may perform, based on said information about the at least one compromised NF, attack mitigation related to said at least one of the at least two different disjoint TN paths or some other TN path. For instance, SMF 114 may initiate resource re-configuration by utilizing a new, alternate data path to mitigate security risks, including the selection of a different anchor UPF for downlink traffic. The approach may be thus proactive to prevent similar attacks, e.g., to NFs involved in other user plane paths and also to mitigate problems due to detected compromised NFs. In some embodiments, signaling storm detection may be performed together with the detection of the compromised NF by analytics function 116 based on network analytics, to enhance security further.

Figure 2:
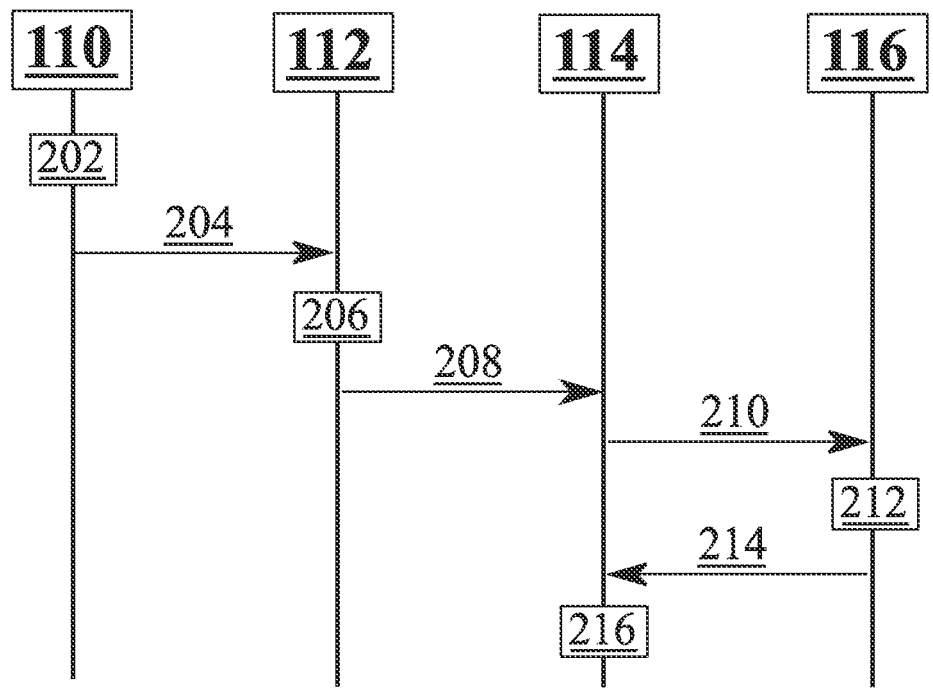
FIG. 2 illustrates a first signaling graph in accordance with at least some embodiments.

FIG. 2 illustrates a first signaling graph in accordance with at least some embodiments. FIG. 2 illustrates an example of configuration of disjoint TN paths that may be utilized for security risk mitigation, e.g., for sensitive data and premium customers. With reference to FIG. 1, on the vertical axes of FIG. 2 are disposed, from the left to the right, TN controller 110, OAM 112, SMF 114 and analytics function 116. Time advances from the top towards the bottom.

At step 202, TN controller 110 may decide and configure at least two disjoint TN paths for SMF 114. At step 204, TN controller 110 may transmit information indicating the at least two disjoint TN paths to OAM 112. In some embodiments, TN controller 110 may indicate via a transport mobile network interface in the management plane which physical network resources, e.g. NFs, routers and/or switches, and underlying paths are disjoined. Thus, TN controller 110 in a TN may indicate links that can be adopted to create paths that use different physical resources to connect different NFs with each other. In some embodiments, TN controller 110 may indicate if different physical servers are used to host the desired NFs.

In some embodiments, said information indicated to SMF 114 may comprise:
- identities of physical servers of each NF on the at least two disjoint TN paths, to identify the server hosting the particular NF instance(s) for example. NFs may have different physical servers in order to be characterized as appropriate members to form disjoint paths; and/or
- at least one binary flag to indicate if the underlying path resources, i.e. switches and/or routers in End Points, EP, like EP_N3, EP_N6 and EP_N9 that connect different UPFs, are exclusively used to form this path or not. A flag of a TN path may indicate that the TN path uses exclusive resources, i.e., resources which are not used to form other paths, and in such a case the TN path may be characterized as disjoint. Paths that share resources with other ones, i.e., one or more underlying switches or routers, may be indicated using another flag, to indicate that the underlying resources are not exclusive. For instance, a list of EPs that share the same TN paths may be indicated. In this way, disjoint paths may be allocated by selecting EPs that do not share the same transport level paths.

At step 206, OAM 112 may characterize disjoint resources. For instance, OAM 112 may characterize the at least two disjoint paths, i.e., similar to URLLC, but having as criteria now the security risks of paths sharing resources. In some embodiments, OAM 112 may determine and mark at least two paths as being made of disjoint resources, thereby resulting to the at least two disjoint paths.

At step 208, OAM 112 may indicate the at least two different disjoint TN paths to SMF 114. Alternatively, or in addition, SMF 114 may also decide to set-up disjoint paths based on other inputs such as an indication from a UE during a session establishment procedure, such as a PDU session establishment procedure, to enhance security further. For example, the indication may be provided in a PDU session establishment request and/or a PDU session modification request message sent by the UE to an AMF, and the AMF may then in turn send to SMF 114 a create context request, like an Nsmf_PDUSession_CreateSMContext Request, or an update context request, like an Nsmf_PDUSession_UpdateSMContext Request, along with this indication. That is, SMF 114 may determine the at least two different disjoint TN paths based on at least one indication associated with a session establishment procedure of the UE. In case of the PDU session establishment and/or PDU session modification procedure, such an enhancement may be for example applied in clause 4.3 of 3GPP TS 23.502. In some embodiments, a similar approach may be followed to configure at least two disjoint paths from the AMF to other NFs, based on the indication of the UE.

At step 210, SMF 114 may transmit a subscription request to analytics function 116, such as NWDAF and/or MDAF, to receive notifications about attacks on at least one of the at least two disjoint TN paths, i.e., to get analytics related to the at least two disjoint paths. Analytics function 116 may then perform, at step 212, risk assessment on the at least two disjoint TN paths and determine at least one compromised NF on said at least one of the at least two disjoint paths. Analytics function 116 may further transmit, at step 214, information about the at least one compromised NF, such as an identity and/or location of the compromised NF, to SMF 114. Upon receiving said information, SMF 114 may further trigger, at step 216, a proactive action to prevent security threats and perform attack mitigation related to said at least one of the at least two disjoint TN paths or some other path.

Figure 3:
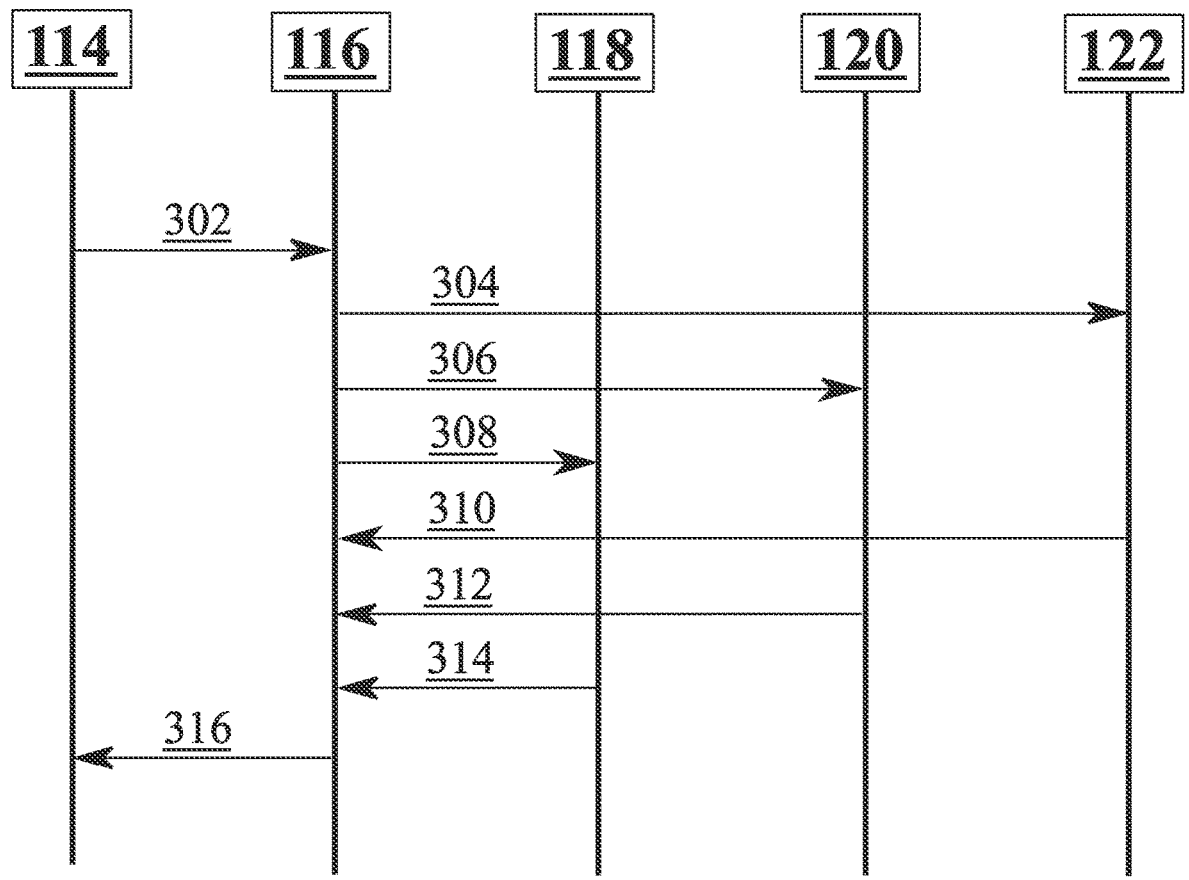
FIG. 3 illustrates a second signaling graph in accordance with at least some embodiments.

FIG. 3 illustrates a second signaling graph in accordance with at least some embodiments. FIG. 3 illustrates an example of a procedure to subscribe to network analytics to detect at least one compromised NF on the at least one of the at least two different disjoint TN paths. On the vertical axes are disposed, from the left to the right, SMF 114 and analytics function 116 of FIG. 1. In addition, AMF 118, NF providing Management Service, MnS, 120 and Application Function, AF, 122, are shown. Time advances from the top towards the bottom.

At step 302, SMF 114 may transmit a subscription request to analytics function 116, to request notifications about attacks on at least one of the NF on at least one of the two disjoint TN paths. SMF 114 may subscribe to analytics function with an analytics identity like "Malicious NF detection per path". The subscription request may be in the following form for example "Nnwdaf_AnalyticsSubcription_Subscribe (Malicious NF detection (Path-1, path-2, . . . ), attack details)". In some embodiments, the subscription request may comprise one or more PDU session data path(s) of interest and/or corresponding UPFs. In the subscription request, SMF 114 may optionally request for "attack details" and root cause analysis if applicable. SMF 114 may also provide path details, e.g. for N3, N9, N6, for the corresponding UPFs. Alternatively, or in addition, SMF 114 may indicate Radio Access Network, RAN, details e.g. as part of N3 details.

Upon receiving the subscription request, analytics function 116 may transmit a subscription request to at least one other NF and/or AF to request information for determining that the at least one compromised NF affects adversely said at least one of the at least two disjoint TN paths. Analytics function 116 may transmit the subscription request for example to AMF 118, NF/MnS 120 and AF 122, as illustrated at steps 304, 306, 308 of FIG. 3, respectively.

In case of AF 112, analytics function 116 may subscribe to get details of the at least one compromised NF. Analytics function 116 may for example subscribe to AF 112 to get application level details related to performance. Additionally, AF 112 may provide a list of Internet Protocol, IP, addresses that are potentially malicious, e.g., certain Server IP address(es) that may function unexpectedly, e.g., sending malwares or sending too many messages.

Additionally, analytics function 116 may have subscribed to one or more of said NFs and/or AFs already. In general, the subscription request may be in the following form for example "Naf_EventExposure_Notify (list of IP per Data Network Access Identifier, DNAI, Fully Qualified Domain(s), FQDN(s), attack details)".

In response to the received subscription request from analytics function 116, the at least one other NF and/or AF may transmit said information to analytics function 116 and analytics function 116 may determine the at least one compromised NF based on the received information. Analytics function 116 may receive said information for example from AMF 118, NF/MnS 120 and AF 122, as illustrated at steps 310, 312, 314 of FIG. 3, respectively. Said information may comprise for example a list of IP addresses per DNAI, FQDN(s) and/or attack details. Attack details may further comprise a list of source IP address of a data server with unexpected or abnormal behaviour.

Upon receiving said information, analytics function 116 may generate analytics and based on said analytics, transmit at step 316 information about the at least one compromised NF to SMF 114, such as an identity of the compromised NF, like an identity of a compromised NF, a list of IP addresses for specific DNAI in case of external attacks, FQDN, security risks analytics per NF or link, security risk patterns indicating a sequence of NFs that may be part of a potential attack.

Analytics function 116 may generate said analytics based on for example communication patterns per path, which may be correlated with resource usage per domain or sub-domain to compare with more global traffic patterns. In some embodiments, analytics function 116 may generate said analytics by correlating security risks among physical and virtual resources, i.e., gain understanding on security risks among different resources, e.g., among interconnected NFs, or among different NFs that share physical server resources. Alternatively, or in addition, analytics function 116 may identify security risk patterns, like a series of abnormal incidents that prepared an attack and/or strategy of a security attack, i.e., identify series of attack patterns.

Figure 4:
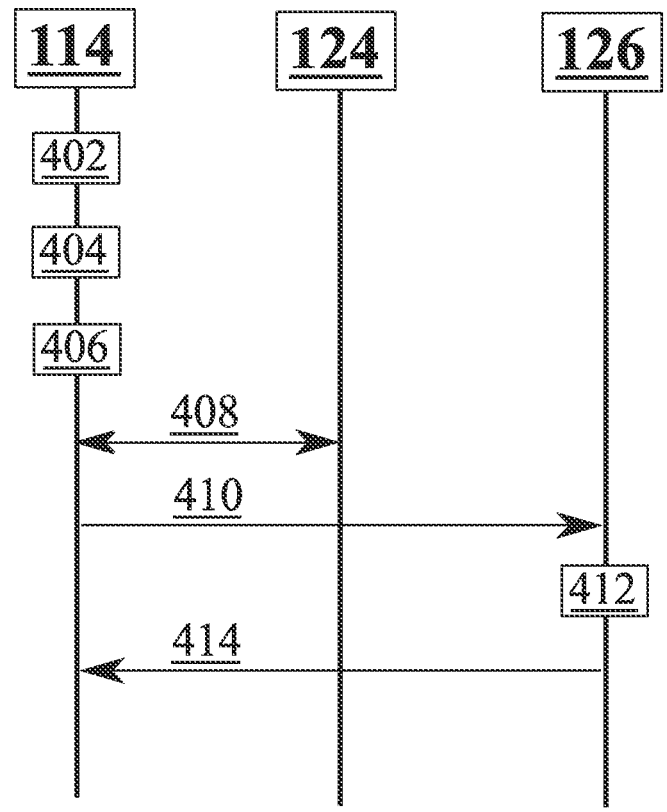
FIG. 4 illustrates a third signaling graph in accordance with at least some embodiments.

FIG. 4 illustrates a third signaling graph in accordance with at least some embodiments. On the vertical axes are disposed, from the left to the right, SMF 114 of FIG. 1, UPF 124 and PDU Session Anchor, PSA, -UPF 126. Time advances from the top towards the bottom. FIG. 4 illustrates an example of a procedure to mitigate attacks by SMF 114, based on said information about the at least one compromised NF received from analytics function 116 at step 316 of FIG. 3 for example. More specifically, FIG. 4 illustrates a resource re-configuration, initiated by SMF 114, to adopt a new and/or alternate data path, possibly including anchor UPF for downlink traffic, to mitigate security risks. The resource re-configuration may be performed proactively, to prevent similar attacks, e.g., to NFs involved in other/alternate data path, i.e., user plane paths, for instance considering a security risk patterns of an attack and also to mitigate problems due to detected compromised NFs.

Step 402 may comprise step 316 of FIG. 3, wherein SMF 114 may receive said information about the at least one compromised NF from analytics function 116. Upon receiving said information SMF 114 may, at step 404, determine that the at least one compromised NF is on an existing data path, i.e., on the disjoint path in use, and trigger a path switch, new path establishment and/or selection of a different UPF on the existing data path. That is, SMF 114 may perform, based on said information about the at least one compromised NF, attack mitigation related to said at least one of the at least two different disjoint TN paths, by performing path switching, new path establishment and/or selection of a different UPF.

At step 406, SMF 114 may perform, based on said information about the compromised NF, attack mitigation related to another TN path (other than the at least two disjoint paths) by performing a reconfiguration of said another TN path. For instance, SMF 114 may perform N4 reconfiguration to block an attacker, dynamically change security level, avoid Distributed Denial of Service, DDoS, attack, i.e., SMF updates all UPFs with rules to block certain specific traffic, change the source/destination address, etc. via enhanced N4 procedures between SMF 114 and UPF(s).

In some embodiments, if an Intermediate SMF, I-SMF, is serving the PDU session, SMF 114 may also provide SMF 114 these rules to the I-SMF with an identified mitigation enhancement to N16a procedures between SMF 114 and the I-SMF.

At step 408, SMF 114 may transmit a session modification request to UPF 124. The session modification request may be for example an enhanced N4 Session Modification Request and specified for example in 3GPP TS 23.502 and TS 23.501. The session modification request may be in the following form "N4 Session Modification Request (Update to PDRs and FARs (drop all packets from Source NF ID, FQDN, DNAI, measures to block identified attack on Path-1))". UPF 124 may acknowledge the session modification request as well, at step 408.

At step 410, SMF 114 may transmit another session modification request to PSA-UPF 126. Said another session modification request may be in the following form "N4 Session Modification Request (Update to Packet Detection Rules, PDRs, and Forwarding Rules, FARs, (drop all packets Src IP list, FQDN, DNAI, Src NF ID, measures to block identified attack on Path-1))". At step 412, PSA-UPF may reject all data network traffic coming from NFs on the Src IP list. At step 414, SMF 114 may receive a session modification response, like an N4 Session Modification response, from PSA-UPF 126. Thus, SMF 114 may transmit a session modification request to UPF 124 and/or PSA-UPF 126, to request dropping of all packets of the at least one compromised NF, to enhance security and avoid unnecessary loading of the network in the future.

Figure 5:
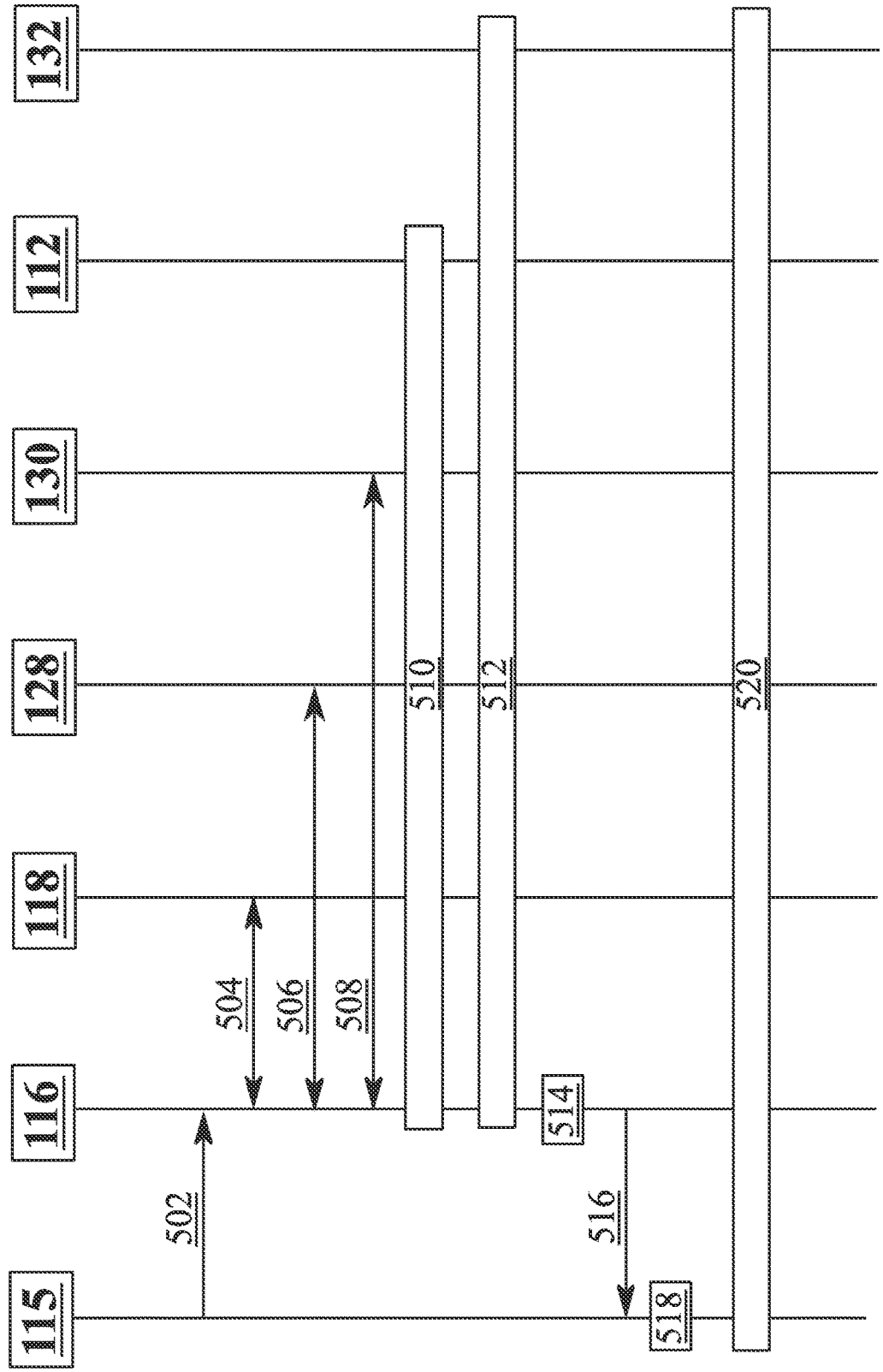
FIG. 5 illustrates a fourth signaling graph in accordance with at least some embodiments.

FIG. 5 illustrates a fourth signaling graph in accordance with at least some embodiments. FIG. 5 illustrates an example of a procedure to detect signaling storms. On the vertical axes are disposed, from the left to the right, NF 115, analytics function 116, AMF 118, AUSF 128, UDM 130, OAM 112 and RAN node 132, such as a base station, like gNB. Time advances from the top towards the bottom. NF 115 may be a consumer NF or an OAM. In some embodiments, SMF 114 may perform the tasks of NF 115.

In general, analytics function 116 may collect data from AMF 118, AUSF 128, UDM 130 and RAN node 132, for example over Service Based Interface, SBI, or via OAM 112 (logs) over Service Based Management Architecture, SBMA. After that, analytics function 116 may generate a report if a signaling storm attack is detected. Based on the report, NF 115 may take mitigation action to control the rate of traffic in the NFs/RAN nodes.

In case of signaling storm attacks, a group of malicious UEs or robot UEs may pretend and behave like a genuine UE, but generate a huge amount of signaling towards core network 100. As an example, such malicious UEs may send a large number of registration requests by generating random UE identities, e.g., Subscription Concealed Identifier, SUCI, thus giving the impression to core network 100 that each new registration request is from a different and genuine UE. AMF 118, AUSF 128, UDM 130 and RAN node 132 may become overloaded while processing a large number of received requests. It may be difficult though to detect the actual identity of the UE generating the traffic because SUCI de-concealing may fail, for example if authentication of the UE has not been completed successfully.

At step 502, NF 115 may subscribe to analytics function 116 by transmitting a signaling storm notification request, to request notifications of signaling storm attacks within a signaling storm area, e.g., at the whole PLMN level or in a specific area. For instance, NF 115 may subscribe by invoking "Nnwdaf_Analytics_Subscription_Subscribe (Signaling Strom detection Area/PLMN)".

Analytics function 116 may subscribe to AMF 118, AUSF 128 and/or UDM 130 at steps 504, 506 and 508, respectively. Said subscription(s) may be triggered by the received subscription request(s). Alternatively, analytics function 116 may have requested said subscriptions proactively. Said subscriptions may be invoked by transmitting "Namf/ausf/ udm_EventExposure_Subscribe (Event ID, Threshold of the failure, e.g., 10 Failures/Min", wherein analytics function 116 may provide an identity of an event (Event ID), and threshold of the failure, for example: in case of 10 failures/minute respective NF should notify analytics function 116. AMF 118, AUSF 128, and UDM 130 may reply with a notify message if the threshold (number of failures per time), as indicated in the message received above, has been reached. The threshold may be used to enhance security while ensuring performance, as analytics function 116 may adjust the threshold to prevent unnecessary overloading of the network but at the same time ensure that packets are not blocked for nothing, if that is not really needed.

For instance, in case of events related to AMF 118, that may lead to notifying analytics function 116, AMF 118 may need to support a specific filter or rate control. Examples of the filters comprise:

- inform only when X failure per Y time unit is detected. For example, X could be 10 failures, and time unit could be in minutes, e.g., 10 failures in Y minutes;
- geographical area, e.g., indicated by Tracking Area Indicators, TAIs; and
- general Logs, like Log-Files that AMF 118 may maintain with details of different (failure) procedures or messages e.g. failed Registration request sent by UE(s), or a log level indicating the level of details of the logs to be considered.

At step 510, analytics function 116 may collect logs from AMF 118, AUSF 128 and UDM 130, possibly via OAM 112. At step 512, analytics function 116 may collect logs from RAN node 132. The logs may comprise failure details such a as number of requests received, identities of UEs, NG Application Protocol, NGAP, UE-TN Layer Association, TNLA, -binding and so on.

If for example AMF 118 detects such a failure rate, AMF 118 may transmit a notification to analytics function 116 accordingly. In addition, AMF 118 may generate logs that may be collected by analytics function 116. For instance, a SBI notification may comprise a failure type, a SUCI, TAI of reported failure, NGAP UE-TNLA-binding, TNL association, identity of an AMF, number of requests received, etc. Logs may have extra information of the events on top of the SBI notification, like details of each failure such as gNB details, SUCI, TAI, time stamp, AMF details and all parameters received in the incoming signaling from the UE/gNB.

Analytics function 116 may collect failure rate events notifications from AUSF 128 and UDM 130 similarly. Events of AUSF 128 may show the failure from different AMFs. Events of UDM 130 may show the failure from different AUSFs. Analytics function 116 may also collect logs from RAN node 132 to see the load of RAN nodes, failure rate at the RAN nodes, NGAP UE-TNLA-binding, TNL association, etc.

At step 514, analytics function 116 may perform analytics and detect at least one signaling storm attack within the signaling storm area. In addition, analytics function may determine source(s) of attack(s). At step 516, analytics function 116 may transmit a notification of each detected signaling storm attack, and possibly information about sources as well, to NF 115. The notification may be invoked for example by transmitting "Nnwdaf_AnalyticsSubscription_Notify".

Upon receiving the notification NF 115 may, at step 518, initiate attack mitigation according to a configuration and/or operator policies. For instance, NF 115 may, at step 520, perform the following actions:

- instruct NFs of core network 100, e.g., to AMF 118, to block all nodes in certain TAI(s) or a particular cell within the TAI;
- instruct AMF 118 and/or RAN node 132, to limit the rate of the UE attach in the area wherein the attack happens, or happened. For example, during an attach procedure of a UE, filters may be activated for the random access channel procedure or radio resource control connection request procedure, where the UE connection does not progress to the step of sending the radio resource control message to send the non-access stratum message containing the SUCI or SUPI;
- instruct an access network node, like RAN node 132, to block all requests coming on the indicated NGAP UE-TNLA-binding; and/or
- instruct AMF 118 to reject all UE messages coming on the indicated TNL association.

Even though the compromised NF is used as an example, any compromised network entity on the network path, like compromised NF(s) and/or transport Network entities, such as a router, switch and/or hardware used by software, may operate in the same way as the compromised NF. For instance, if whole private cloud-X or some hardware in some site are compromised, then an NF may avoid any NF/switch hosted on the private cloud-X or the relevant hardware and select the alternative route not passing via cloud-X/hardware.

Physical resources may also mean hardware (memory, CPU, Disk or some machine). An NF may be a logical entity that is a group of softwares running on the hardware or on the cloud.

Figure 6:
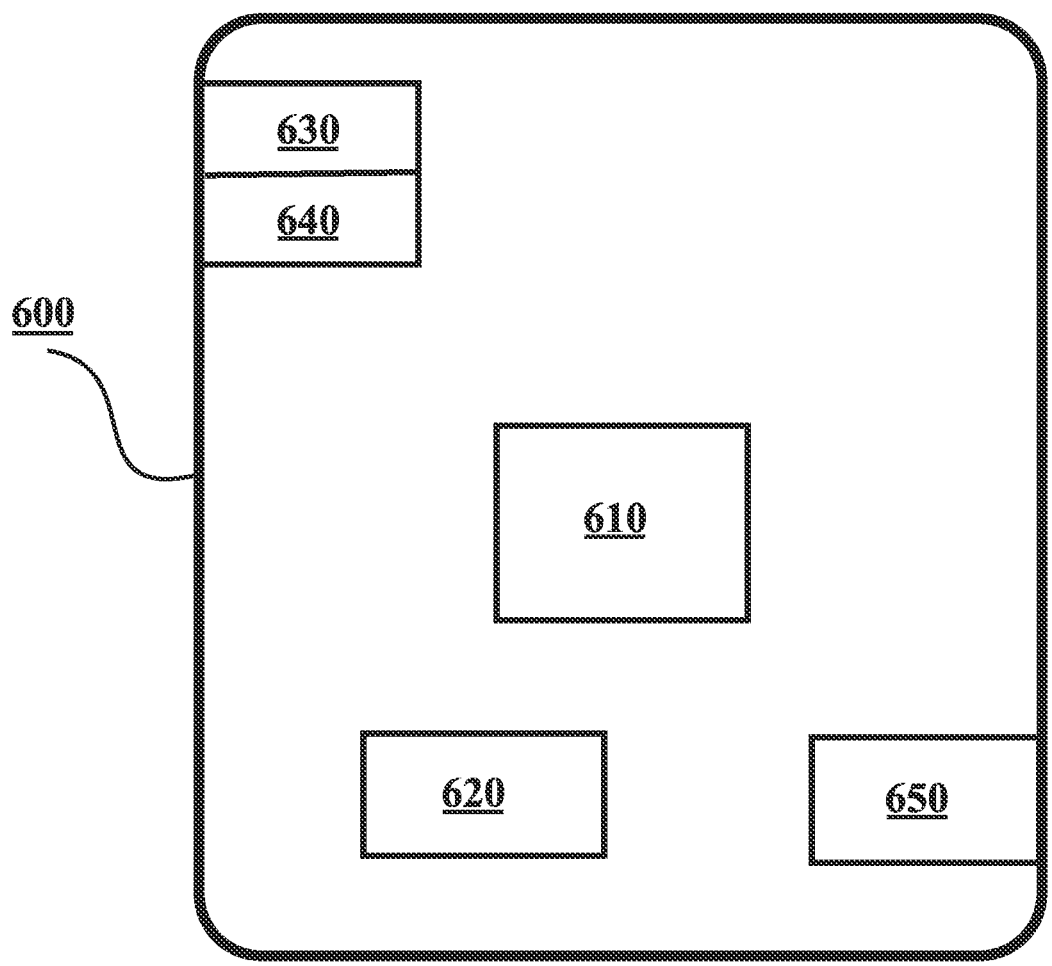
FIG. 6 illustrates an example apparatus capable of supporting at least some embodiments.

FIG. 6 illustrates an example apparatus capable of supporting at least some example embodiments. Illustrated is apparatus 600, which may comprise means for operating, or be configured to operate, as SMF 114, or any NF in general which may perform tasks of SMF 114 as described herein, or analytics function 116. Comprised in apparatus 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. Processor 610 may comprise at least one Application-Specific Integrated Circuit, ASIC. Processor 610 may comprise at least one Field-Programmable Gate Array, FPGA. Processor 610 may comprise an Intel Xeon processor for example. Processor 610 may be means for performing method steps in apparatus 600, such as determining, causing transmitting and causing receiving. Processor 610 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Apparatus 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and apparatus 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to apparatus 600 but accessible to apparatus 600.

Apparatus 600 may comprise a transmitter 630. Apparatus 600 may comprise a receiver 640. Transmitter 630 and receiver 640 may be configured to transmit and receive, respectively, information in accordance with at least one cellular standard, such as a standard defined by the 3GPP. Transmitter 630 may comprise more than one transmitter. Receiver 640 may comprise more than one receiver. Transmitter 630 and/or receiver 640 may be configured to operate in accordance with a suitable communication standard.

Apparatus 600 may comprise User Interface, UI, 650. UI 650 may comprise at least one of a display, a keyboard, a touchscreen, a vibrator arranged to signal to a user by causing apparatus 600 to vibrate, a speaker and a microphone. A user may be able to operate apparatus 600 via UI 650, for example to configure apparatus 600 and/or functions it runs.

Processor 610 may be furnished with a transmitter arranged to output information from processor 610, via electrical leads internal to apparatus 600, to other devices comprised in apparatus 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to apparatus 600, from other devices comprised in apparatus 600. Such a receiver may comprise a serial bus receiver arranged to, for example, receive information via at least one electrical lead from receiver 640 for processing in processor 610. Alternatively to a serial bus, the receiver may comprise a parallel bus receiver.

Apparatus 600 may comprise further devices not illustrated in FIG. 6. In some example embodiments, apparatus 600 lacks at least one device described above. For example, apparatus 600 may not have UI 650.

Processor 610, memory 620, transmitter 630, receiver 640 and/or UI 650 may be interconnected by electrical leads internal to apparatus 600 in a multitude of different ways. For example, each of the aforementioned devices may be separately connected to a master bus internal to apparatus 600, to allow for the devices to exchange information. However, as the skilled person will appreciate, this is only one example and depending on the example embodiment various ways of interconnecting at least two of the aforementioned devices may be selected without departing from the scope of the present invention.

Figure 7:
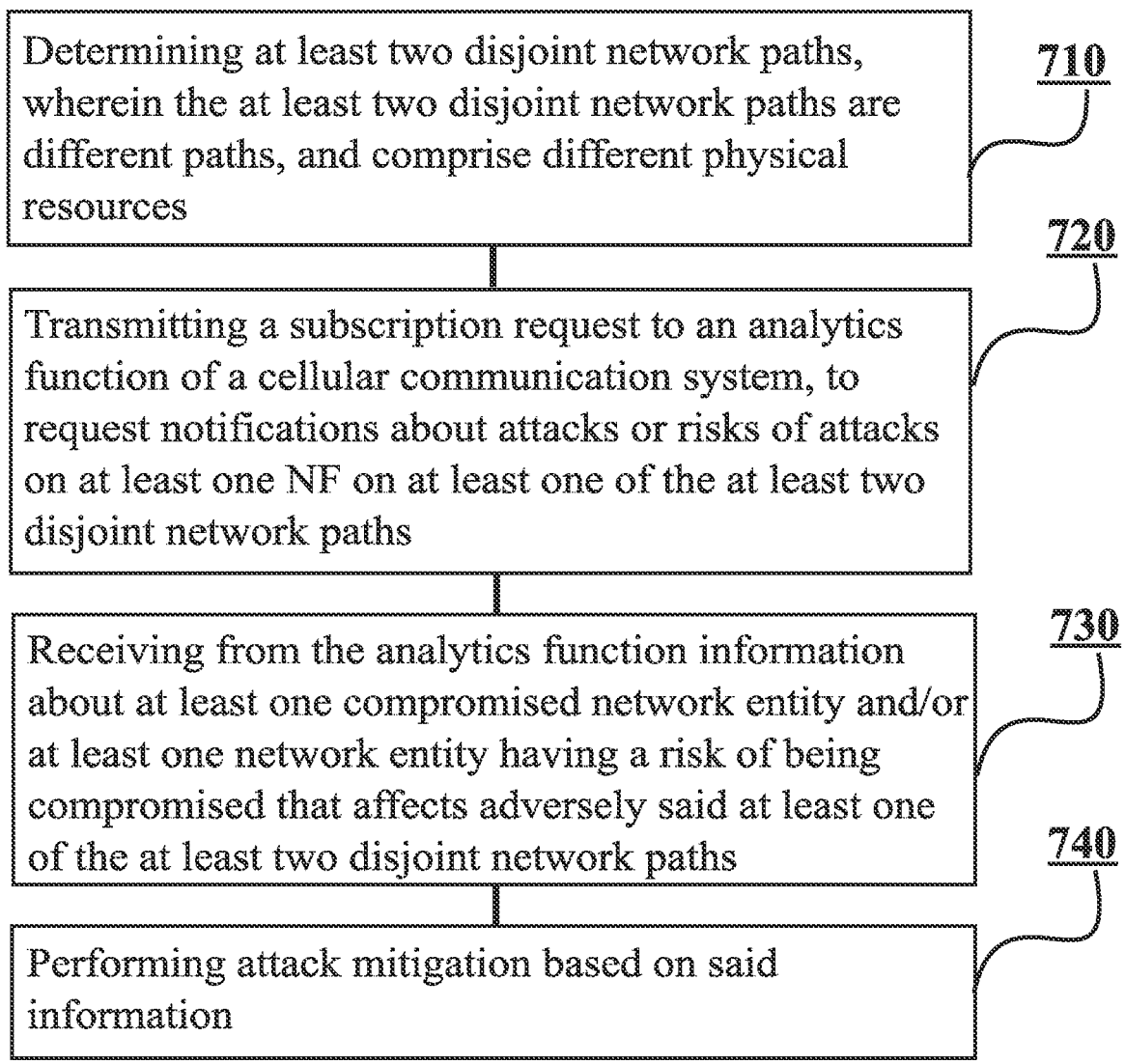
FIG. 7 illustrates a flow graph of a method in accordance with at least some embodiments.

FIG. 7 is a flow graph of a method in accordance with at least some embodiments. The phases of the illustrated method may be performed by an apparatus configured to perform tasks of SMF 114.

The method may comprise, at step 710, determining, by an apparatus configured to operate as a network function a cellular communication system, at least two disjoint network paths, wherein the at least two disjoint network paths are different paths, and comprise different physical resources. At step 720, the method may comprise transmitting, by the apparatus, a subscription request to an analytics function of the cellular communication system, to request notifications about attacks or risks of attacks on at least one network function on at least one of the at least two disjoint network paths. At step 730, the method may comprise receiving from the analytics function, by the apparatus, information about at least one compromised network entity and/or at least one network entity having a risk of being compromised that affects adversely said at least one of the at least two disjoint network paths. Finally, the method may comprise, at step 740, performing, by the apparatus, attack mitigation based on said information.

In some embodiments, the network paths may be set-up and configured by a network function, for example the SMF. In one example embodiment, the two network paths may be different paths between the apparatus and at least one other NF. In a second example embodiment, the network paths may be between a UE and an external server or node.

In some embodiments, one or more compromised NFs/entities may be on the path. This path may be set-up and configured by the apparatus/SMF. The path may be between a UE and (often/always) external server/destination (located in the Data Network).

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an example embodiment, an apparatus may comprise means for carrying out the embodiments described above and any combination thereof. The apparatus may for example comprise means for operating as SMF 114 or analytics function 116, as described herein.

In an example embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an example embodiment, an apparatus may comprise at least one processor, and at least one memory including computer program code, wherein the at least one memory and the computer program code are configured to, with the at least one processor, cause the apparatus at least to perform the embodiments described above and any combination thereof. The at least one memory and the computer program code may be configured to, with the at least one processor, cause the apparatus at least to operate as SMF 114 or analytics function 116, as described herein.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, for example in 3GPP networks.

Acronyms List

3GPP $3^{rd}$ Generation Partnership Project
AF Application Function
AMF Access and Mobility management Function
API Application Programming Interface
AUSF Authentication Server Function
DDoS Distributed Denial of Service
DNAI Data Network Access Identifier
EP End Point
FAR Forwarding Rules
FQDN Fully Qualified Domain
IP Internet Protocol
I-SMF Intermediate SMF
MDAF Management Data Analytics Function
MnS Management Service
NAS Non-Access Stratum
NF Network Function
NGAP NG Application Protocol
NWDAF Network Data Analytics Function
OAM Operations, Administration and Maintenance
PDR Packet Detection Rules
PDU Packet Data Unit
PLMN Public Land Mobile Networks
PSA PDU Session Anchor
RAN Radio Access Network
SBA Service-Based Architecture
SBI Service Based Interface
SBMA Service Based Management Architecture
SMF Session Management Function
SUCI Subscription Concealed Identifier
TN Transport Network
TNLA TN Layer Association
UDM Unified Data Manager
UDR Unified Data Repository
UE User Equipment
UPF User Plane Function
URLLC Ultra-Reliable Low-Latency Communication
VNF Virtual Network Function

REFERENCE SIGNS LIST

| | |
|---|---|
| 100 | Core network |
| 110 | TN controller |
| 112 | OAM |
| 114 | NF, such as SMF |
| 115 | NF, such as consumer NF or OAM |
| 116 | Analytics function |
| 118 | AMF |
| 120 | NF/MnS |
| 122 | AF |
| 124 | UPF |
| 126 | PSA-UPF |
| 128 | AUSF |
| 130 | UDM |
| 132 | RAN node, such as a base station |
| 202-216 | Steps in the signaling graph of FIG. 2 |
| 302-316 | Steps in the signaling graph of FIG. 3 |
| 402-414 | Steps in the signaling graph of FIG. 4 |
| 502-520 | Steps in the signaling graph of FIG. 5 |
| 600-650 | Structure of the apparatus of FIG. 6 |
| 710-740 | Phases of the first method of FIG. 7 |

The invention claimed is:

1. An apparatus comprising at least one processing core, at least one memory including computer program code, the at least one memory and the computer program code being configured to, with the at least one processing core, cause the apparatus at least to:
   operate as a network function of a cellular communication system;
   determine at least two disjoint network paths, wherein the at least two disjoint network paths are different paths, and comprise different physical resources;
   transmit a subscription request to an analytics function of the cellular communication system, to request notifications about attacks or risks of attacks on at least one network function on at least one of the at least two disjoint network paths;
   receive, from the analytics function, information about at least one compromised network entity and/or at least one network entity having a risk of being compromised that affects adversely said at least one of the at least two disjoint network paths; and
   perform attack mitigation based on said information.

2. The apparatus according to claim 1, wherein said different physical resources comprise different network functions, routers, switches, and/or hardware used by software.

3. The apparatus according to claim 1, wherein the at least two disjoint network paths are determined based on information received from a network management plane.

4. The apparatus according to claim 3, wherein said information received from the network management plane comprises identities of network functions on the at least two disjoint network paths and/or at least one flag indicating that the at least two network paths are disjoint.

5. The apparatus according to claim 1, wherein the at least two disjoint network paths are determined based on at least one indication associated with a session establishment procedure of a user equipment.

6. The apparatus according to claim 1, wherein the at least one memory and the computer program code are further configured to, with the at least one processing core, cause the apparatus at least to:
   perform, based on said information, attack mitigation related to said at least one of the at least two disjoint network paths by performing path switching, new path establishment and/or selection of a different user plane function.

7. The apparatus according to claim 1, wherein the at least one memory and the computer program code are further configured to, with the at least one processing core, cause the apparatus at least to:
   perform, based on said information, attack mitigation related to another network path by performing a reconfiguration of said another network path.

8. The apparatus according to claim 1, wherein the at least one memory and the computer program code are further configured to, with the at least one processing core, cause the apparatus at least to:
   transmit a session modification request to a user plane function, to request to remove from a user path the at least one compromised network entity and/or at least one network entity having a risk of being compromised and/or dropping of at least one packet of the compromised network entity and/or at least one network entity having a risk of being compromised.

9. An apparatus comprising at least one processing core, at least one memory including computer program code, the at least one memory and the computer program code being configured to, with the at least one processing core, cause the apparatus at least to:
   operate as an analytics function in a cellular communication system;
   receive a subscription request from a network function of the cellular communication system, requesting notifications about attacks or risks of attacks on at least one network function on at least one network path;
   determine that at least one compromised network entity or network entity having a risk of being compromised is on at least one of at least two disjoint network paths; and
   transmit information about the compromised network entity and/or at least one network entity having a risk of being compromised to the network function.

10. The apparatus according to claim 9, wherein the at least one memory and the computer program code are further configured to, with the at least one processing core, cause the apparatus at least to:
    transmit a subscription request to at least one other network function and/or application function, to request information for determining whether there is at least one compromised network entity and/or at least one network entity having a risk of being compromised; and
    determine the compromised network entity and/or at least one network entity having a risk of being compromised based on said information received from the at least one other network function and/or application function.

11. The apparatus according to claim 9, wherein the at least one memory and the computer program code are further configured to, with the at least one processing core, cause the apparatus at least to:
    receive a signaling storm subscription request from the network function and/or at least one other network function, requesting notifications of signaling storm attacks;
    detect at least one signaling storm attack; and
    transmit a notification of each detected signaling storm attack to the network function and/or said at least one other network function that has requested notifications of signaling storm attacks.

12. A method comprising:
    determining, by an apparatus configured to operate as a network function a cellular communication system, at least two disjoint network paths, wherein the at least two disjoint network paths are different paths, and comprise different physical resources;
    transmitting, by the apparatus, a subscription request to an analytics function of the cellular communication system, to request notifications about attacks or risks of attacks on at least one network function on at least one of the at least two disjoint network paths;
    receiving from the analytics function, by the apparatus, information about at least one compromised network entity and/or at least one network entity having a risk of being compromised on said at least one of the at least two disjoint network paths; and
    performing, by the apparatus, attack mitigation based on said information.

13. The method according to claim 12, wherein said different physical resources comprise different network functions, routers, switches and/or hardware used by software.

14. The method according to claim 12, wherein the at least two disjoint network paths are determined based on information received from a network management plane.

15. The method according to claim 14, wherein said information received from the network management plane comprises identities of network functions on the at least two disjoint network paths and/or at least one flag indicating that the at least two network paths are disjoint.

16. The method according to claim 12, wherein the at least two disjoint network paths are determined based on at least one indication associated with a session establishment procedure of a user equipment.

17. The method according to claim 12, further comprising:
performing by the apparatus, based on said information, attack mitigation related to said at least one of the at least two disjoint network paths by performing path switching, new path establishment and/or selection of a different user plane function.

18. The method according to claim 12, further comprising:
performing by the apparatus, based on said information, attack mitigation related to another network path by performing a reconfiguration of said another network path.

19. The method according to claim 12, further comprising:
transmitting, by the apparatus, a session modification request, to request to remove from a user path the at least one compromised network entity and/or at least one network entity having a risk of being compromised and/or dropping of at least one packet of the compromised network function and/or the at least one network function having a risk of being compromised.

* * * * *